(12) United States Patent
Ioppolo et al.

(10) Patent No.: US 10,065,532 B2
(45) Date of Patent: Sep. 4, 2018

(54) VEHICLE SEAT

(71) Applicant: BROSE FAHRZEUGTEILE GMBH & CO. KOMMANDITGESELLSCHAFT, COBURG, Coburg (DE)

(72) Inventors: Leo Ioppolo, Washington Township, MI (US); David Becker, Royal Oak, MI (US); Sean Sabo, West Bloomfield, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 280 days.

(21) Appl. No.: 14/942,638

(22) Filed: Nov. 16, 2015

(65) Prior Publication Data
US 2017/0136920 A1 May 18, 2017

(51) Int. Cl.
| | |
|---|---|
| *B60N 2/12* | (2006.01) |
| *B60N 2/20* | (2006.01) |
| *B60N 2/44* | (2006.01) |
| *B60N 2/90* | (2018.01) |
| *B60N 2/07* | (2006.01) |

(52) U.S. Cl.
CPC ............ *B60N 2/12* (2013.01); *B60N 2/20* (2013.01); *B60N 2/442* (2013.01); *B60N 2/443* (2013.01); *B60N 2/919* (2018.02); *B60N 2/929* (2018.02); *B60N 2/0715* (2013.01)

(58) Field of Classification Search
CPC ........... B60N 2/12; B60N 2/20; B60N 2/0715
USPC ................................ 297/341, 344.1; 248/429
See application file for complete search history.

(56) References Cited

U.S. PATENT DOCUMENTS

| | | | | |
|---|---|---|---|---|
| 9,010,712 B2* | 4/2015 | Gray | ............ | B60N 2/0818 248/424 |
| 2004/0051361 A1* | 3/2004 | Rausch | ............ | B60N 2/0705 297/341 |
| 2013/0302626 A1 | 11/2013 | Teufel et al. | | |
| 2014/0353454 A1* | 12/2014 | Yamada | ............ | B60N 2/0705 248/430 |

(Continued)

FOREIGN PATENT DOCUMENTS

| | | | | |
|---|---|---|---|---|
| DE | 102011011766 A1 * | 8/2012 | ........ | B60N 2/0705 |
| DE | 102013214175 B4 * | 11/2014 | ........ | B60N 2/06 |

*Primary Examiner* — Syed A Islama
(74) *Attorney, Agent, or Firm* — Lewis Roca Rothgerber Christie LLP

(57) ABSTRACT

A longitudinally adjustable vehicle seat comprises a seat frame, a backrest pivotally mounted on the seat frame and foldable down in the direction of a seat surface of the seat frame, a longitudinal rail guide having a guide rail pair 2 including a lower guide rail 21 and an upper guide rail 22, a seat adjuster mechanism including a releasable locking device 3 for locking and unlocking the position of the upper guide rail 22 relative to the lower guide rail 21 in a design position P between an internal full rear limit stop and a comfort full forward limit stop 62 defining a functional comfort adjustment range D, an easy-entry mechanism for displacing the vehicle seat to an extended travel full forward position C upon folding down the backrest onto the seat surface, and a pivotable over-travel and limit stop bracket 5 which is adapted to rotate to bypass the comfort full forward limit stop 62 upon activation of the easy-entry mechanism for entering an extended travel range.

14 Claims, 13 Drawing Sheets

(56) References Cited

U.S. PATENT DOCUMENTS

2015/0083882 A1\* 3/2015 Stutika ................. B60N 2/0722
  248/429
2016/0090011 A1\* 3/2016 Stutika ..................... B60N 2/12
  248/429

\* cited by examiner

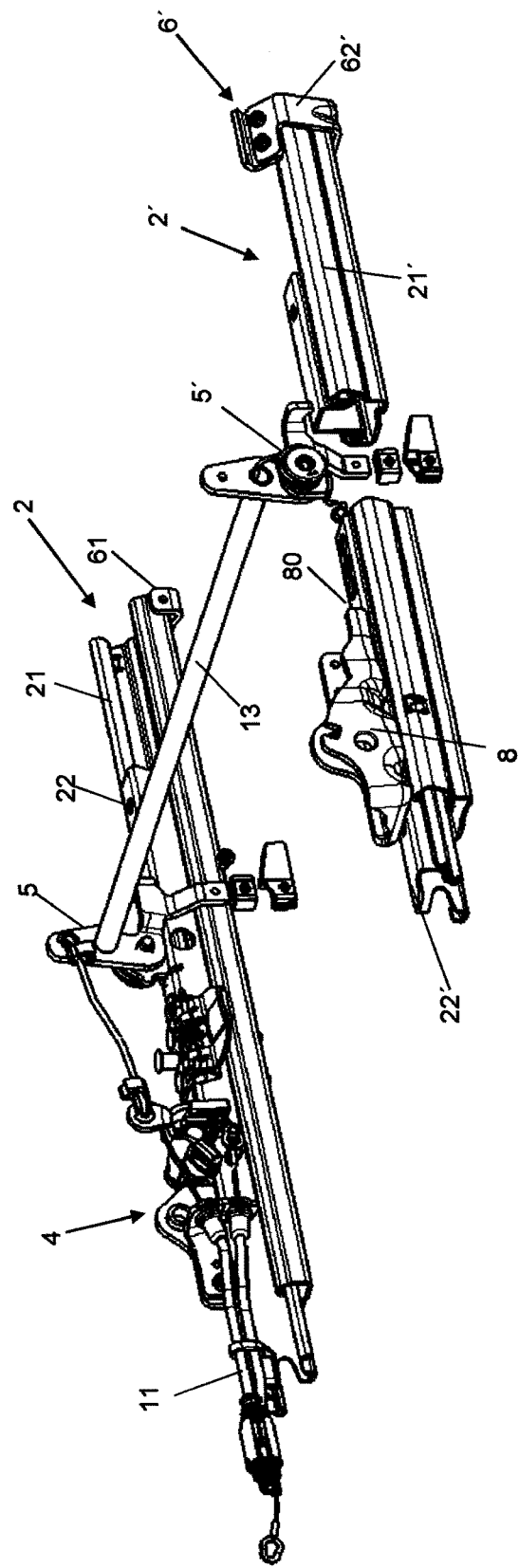

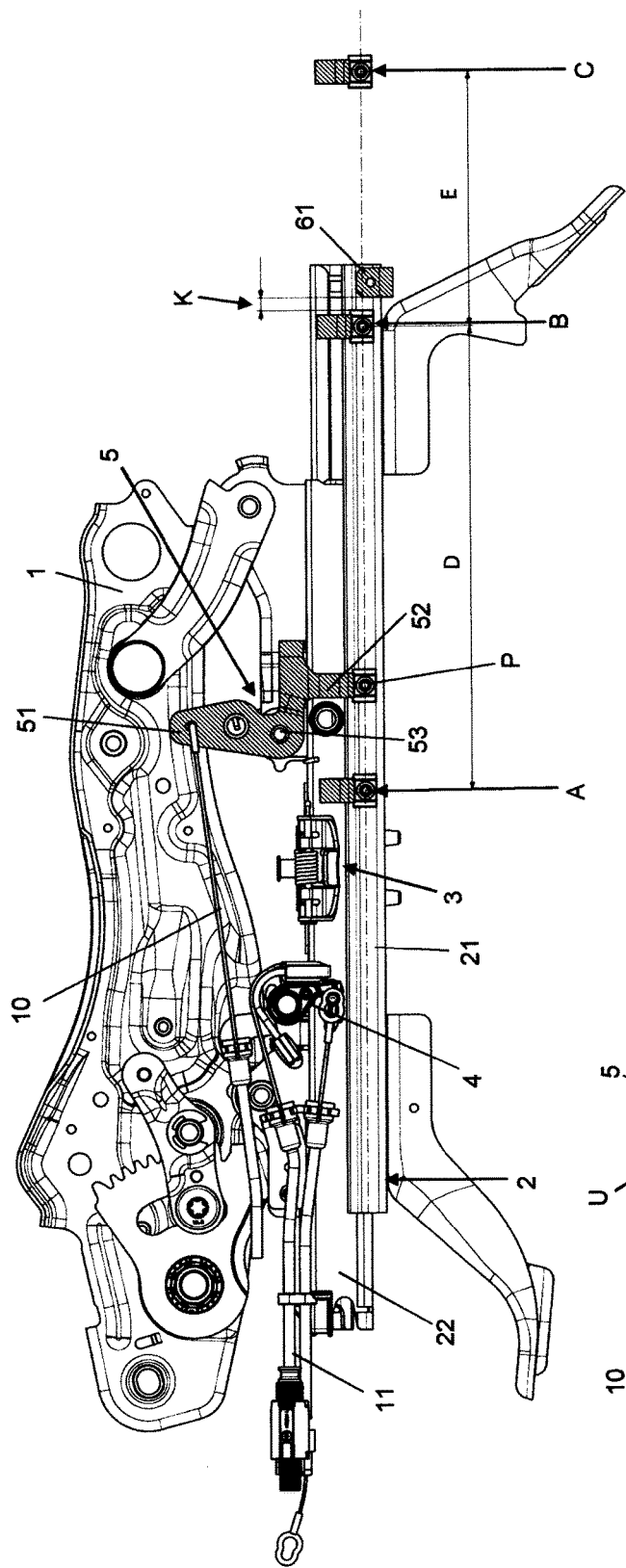
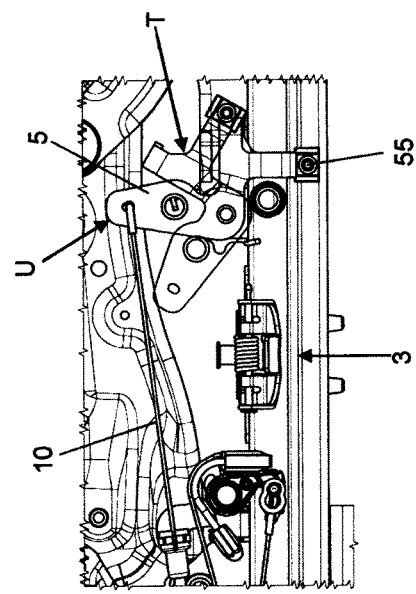

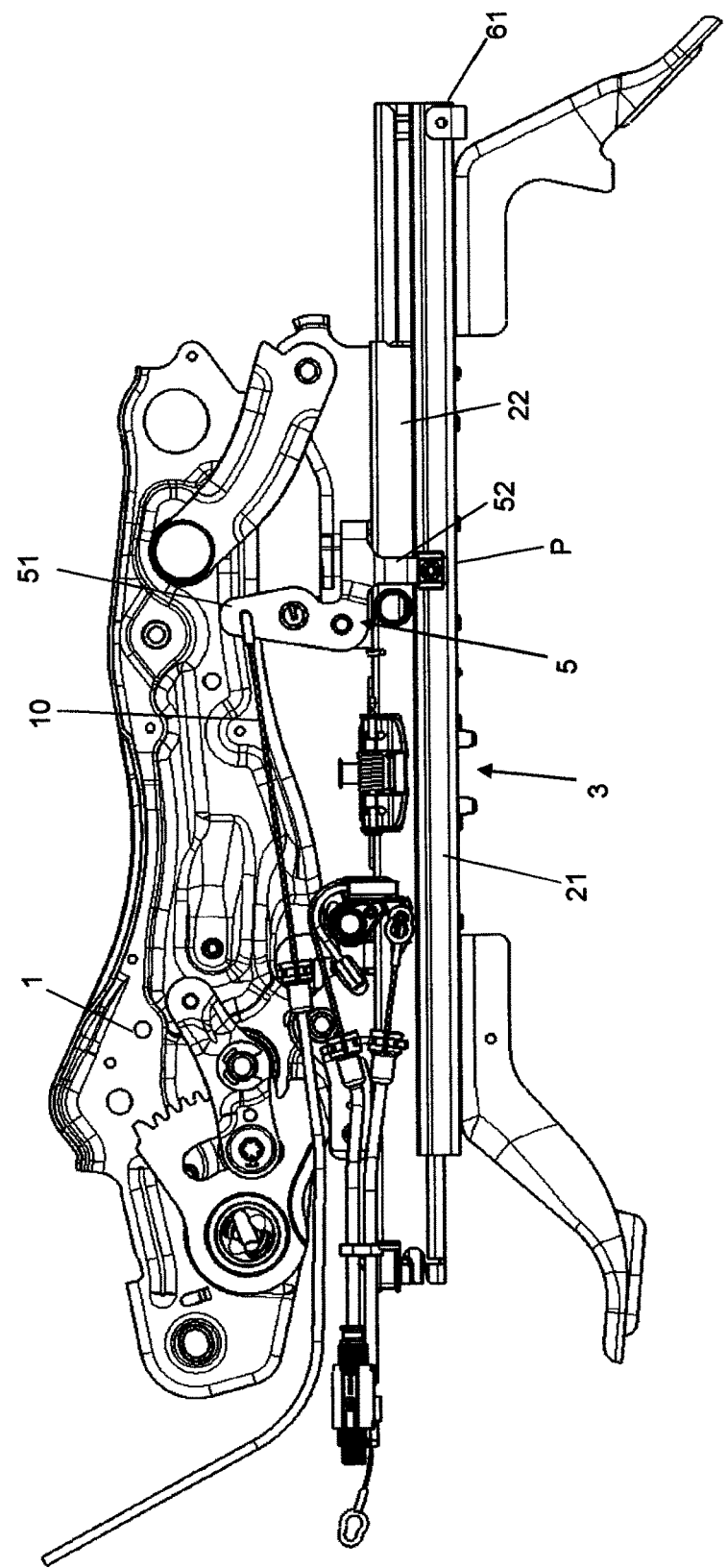

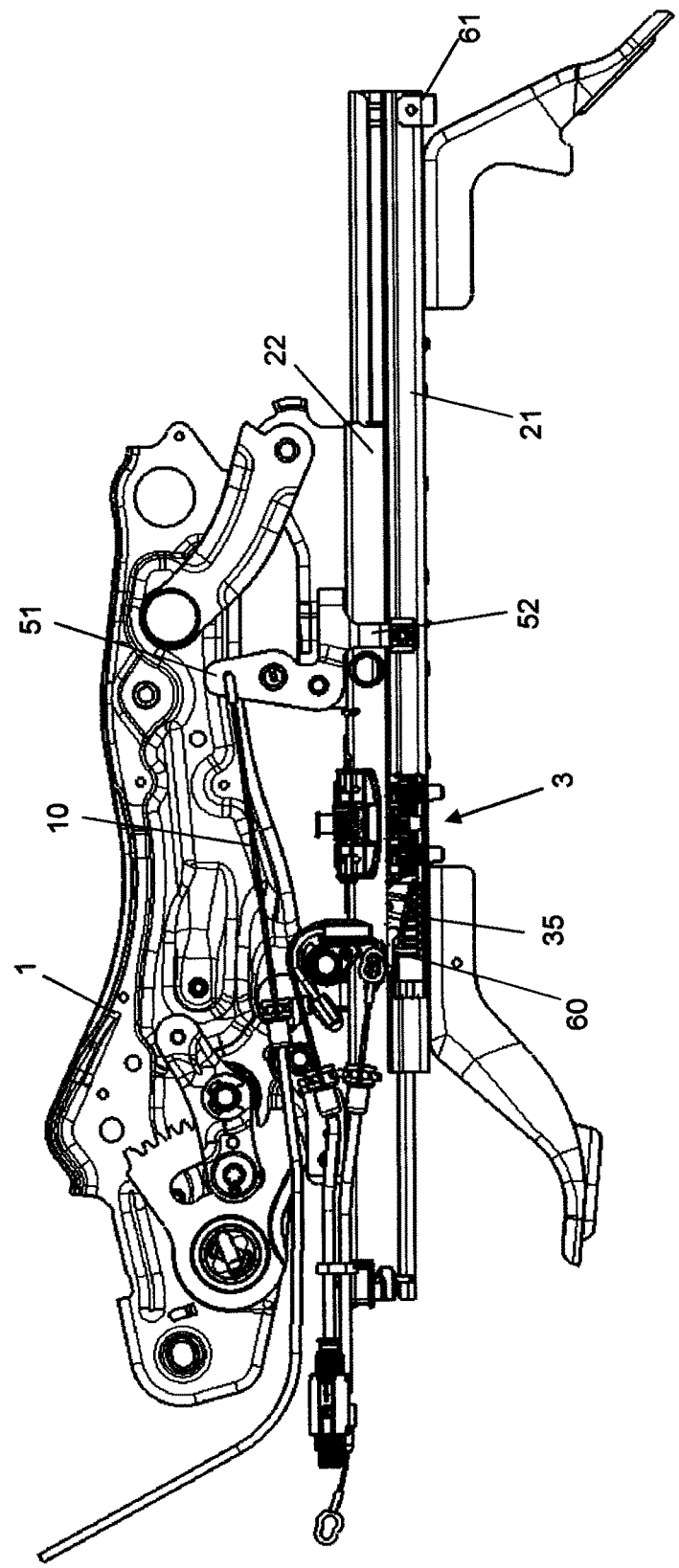

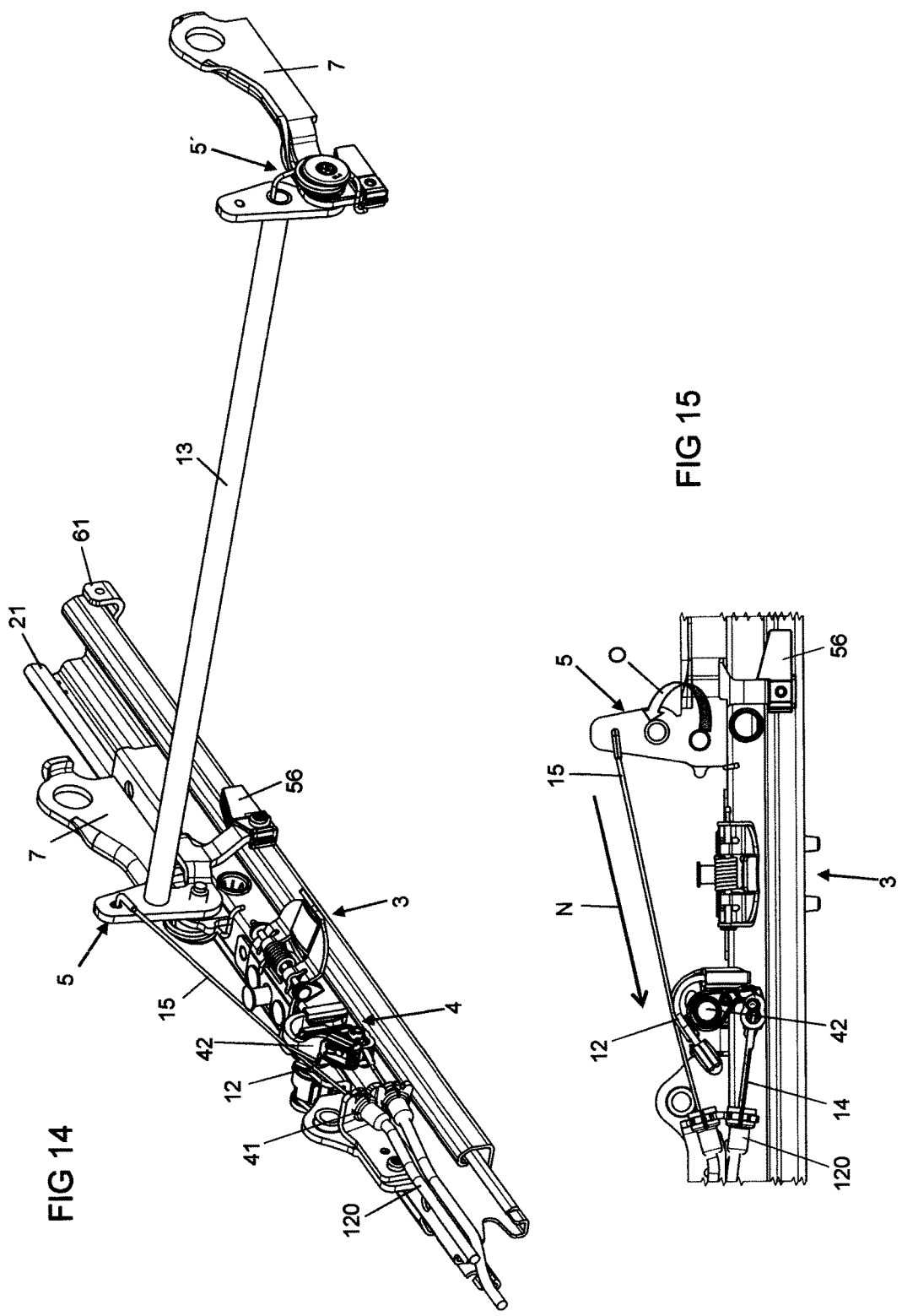

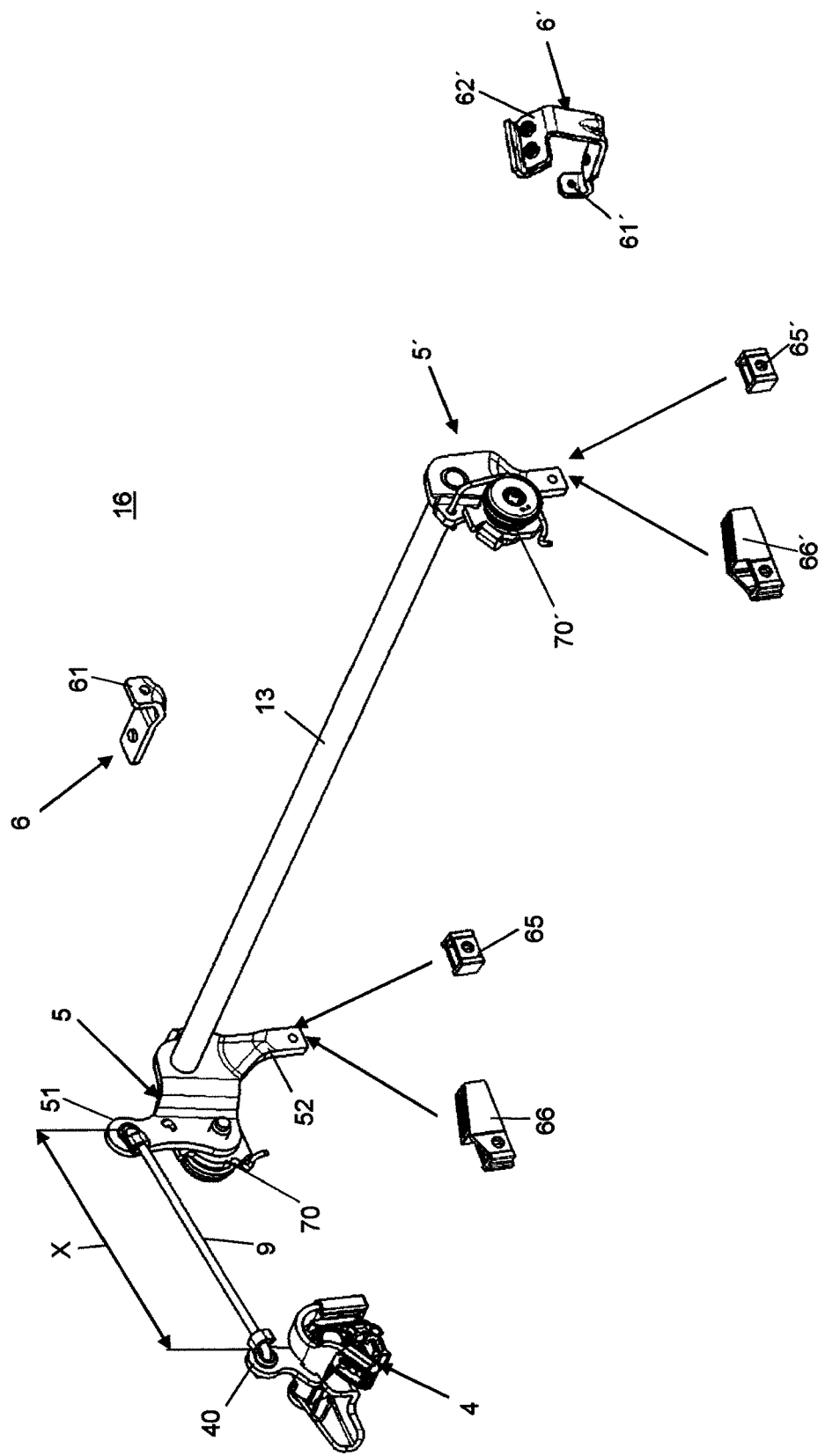

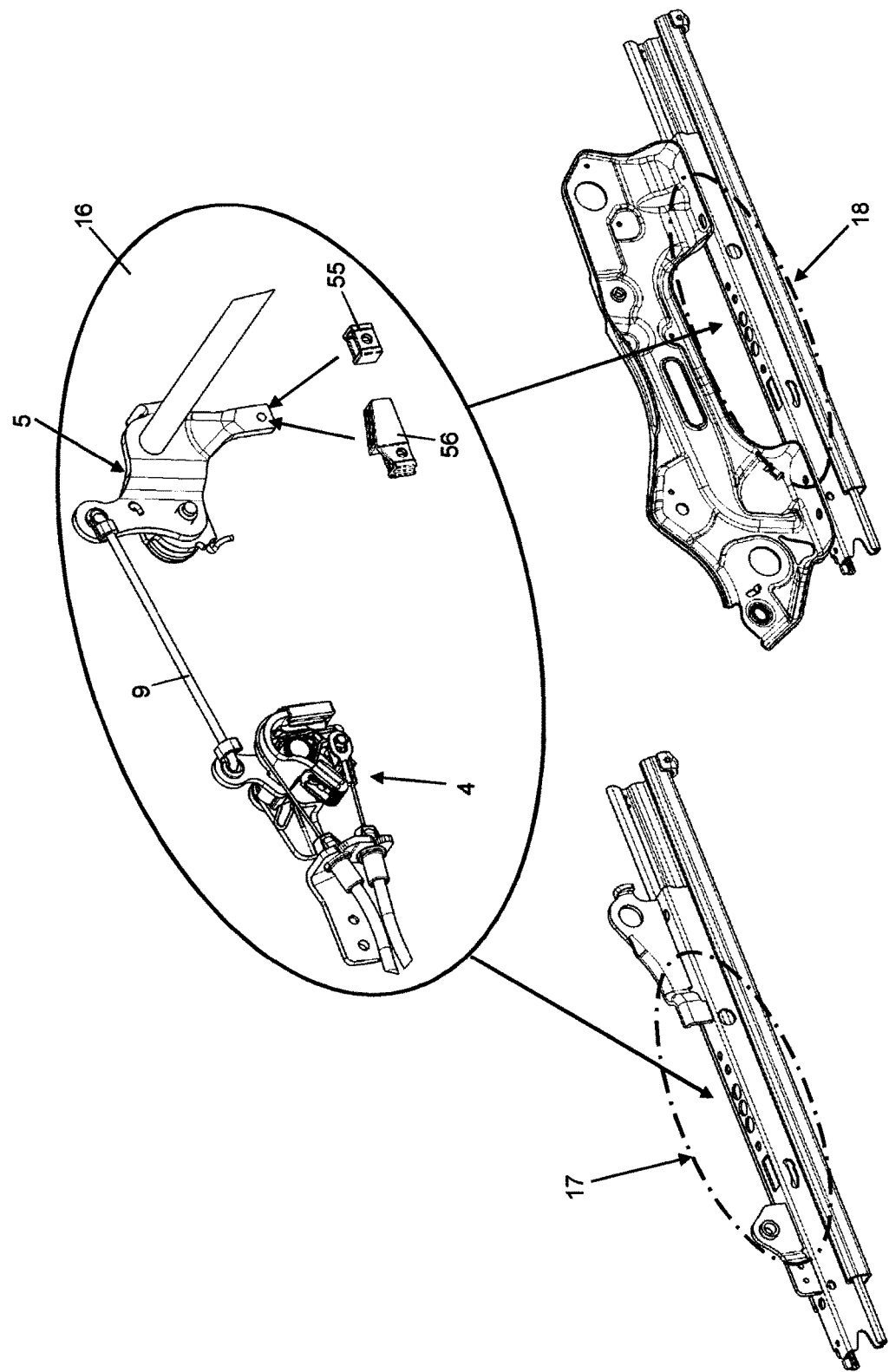

VEHICLE SEAT

TECHNICAL FIELD

The present invention relates to a longitudinally adjustable vehicle seat.

BACKGROUND

Such a longitudinally adjustable vehicle seat comprises a seat frame and a backrest which is mounted on the seat frame and which may be folded down in the direction of a seat surface of the seat frame, a longitudinal rail guide with which the seat frame may be moved in a longitudinal direction for adjusting a longitudinal seating position, a releasable locking device for locking the longitudinal rail guide in a pre-set longitudinal seating position and unlocking the longitudinal rail guide for an adjustment of the seating position in a comfort position for a passenger within a functional comfort adjustment range and an easy-entry mechanism for unlocking the locking device when the backrest is folded down onto the seat surface and for displacing the seat frame and thus the entire vehicle seat to a forward position of an extended travel range of the longitudinally adjustable vehicle seat in order to facilitate the boarding of a passenger into the back of a motor vehicle.

A longitudinally adjustable vehicle seat of this type is known from US 2013/0302626 A1. The known vehicle seat comprises at least one rail pair with a first rail for being fixed to a structure and a second rail connected to the vehicle seat and guided by the first rail; a detachable locking device for detachably locking the position of the first rail with respect to the second rail; a first end stop, a second end stop and a third end stop, delimiting the mobility of the rail pair, in which one of the end stops is constructed in a disconnectable manner by a stop surface which can move out of the traveling path of the rails, wherein the movable stop surface is arranged on the second rail, and the disconnectable end stop, on which the movable stop surface is formed, can be actuated together with the locking device for adopting an easy-entry position. The disconnectable end stop is a front end stop, which delimits a comfort adjustment range forwards, and this comfort adjustment range can be extended forward through moving away the movable stop surface by actuating an easy-entry function. The maximum adjustment range forwards and backwards is limited by a fixed end stop, wherein the comfort adjustment range is a sub-range of the maximum adjustment range. The disconnectable end stop has the movable stop surface, which is arranged on the seat-mounted second rail, and the two other end stops have fixed stop surfaces on the seat-mounted second rail, wherein the movable stop surface of the disconnectable end stop is arranged between the two fixed stop surfaces of the two other end stops.

Thus, the known adjuster for a longitudinally adjustable vehicle seat provides a functional comfort adjustment range which may be extended upon activation of the easy-entry mechanism. However, the functional parts needed for the adjuster are applicable exclusively for the structure of a specific vehicle seat but not applicable to compensate for diverse functional travel ranges between seat adjuster variants.

SUMMARY OF THE INVENTION

It is an object of the present invention to improve the adjustment of a functional travel range for a longitudinally adjustable vehicle seat in a functional comfort adjustment range within which the vehicle seat is adjustable in a comfort position and an extended travel range upon activation of an easy-entry mechanism.

It is an additional object of the present invention to provide a cost effective concept by making use of standardized parts for different sizes and configurations of vehicle seats to compensate for diverse functional travel ranges between seat adjuster variants.

It is a further object of the present invention to provide a complete packaged module for diverse functional travel ranges between seat adjuster variants which can be easily incorporated in existing easy-entry mechanisms and seat adjusters.

In a first aspect, a longitudinally adjustable vehicle seat comprises a seat frame, a backrest pivotably mounted on the seat frame and foldable down in the direction of a seat surface of the seat frame, a longitudinal rail guide having at least one guide rail pair including a lower guide rail fixed to the vehicle structure and an upper guide rail fixed to the seat frame and displaceable along the lower guide rail, a seat adjuster mechanism including a releasable locking device for locking and unlocking the position of the upper guide rail relative to the lower guide rail in a design position of a passenger between a full rear limit stop and a comfort full forward limit stop defining a functional comfort adjustment range within which the vehicle seat is adjustable in the design position, an easy-entry mechanism for displacing the vehicle seat to a front position upon folding down the backrest onto the seat surface, and an over-travel and limit stop mechanism including a pivotable over-travel and limit stop bracket rotatably mounted to the upper rail, said pivotable over-travel and limit stop bracket being adapted to rotate to bypass the comfort full forward limit stop upon activation of the easy-entry mechanism for entering an extended travel range.

The longitudinally adjustable vehicle seat according to the present invention improves the adjustment of a functional travel range for a longitudinally adjustable vehicle seat in a functional comfort adjustment range within which the vehicle seat is adjustable in a comfort position and an extended travel range upon activation of an easy-entry mechanism and provides both a cost effective concept by making use of standardized parts for different sizes and configurations of vehicle seats to compensate for diverse functional travel ranges between seat adjuster variants and a complete packaged module for diverse functional travel ranges between seat adjuster variants which can be easily incorporated in existing easy-entry mechanisms and seat adjusters.

In one aspect, the pivotable over-travel and limit stop bracket is secured to the upper guide rail at a set position in order to achieve the desired functional comfort adjustment range. The pivotable over-travel and limit stop bracket is connected to the upper guide rail and comprises a control arm, a limit stop arm and a rotation axis between the limit stop arm and the control arm, which is connected to the easy-entry mechanism, whereas the limit stop arm strikes against a full forward limit stop defining the comfort full forward position of the functional comfort adjustment range.

In another aspect the limit stop arm is adapted to accommodate different travel ranges to compensate for diverse functional travel ranges between seat adjuster variants by means of travel limiters of different size which can be added to the limit stop arm which travel limiters in particular are sleeves of different size in the direction of travel with a connection portion for connecting the sleeves to the end of said limit stop arm of the pivotable over-travel and limit stop bracket.

In still another aspect the rotation axis of the pivotable over-travel and limit stop bracket is incorporated into a bearing of a seat adjuster adapter secured to the upper guide rail and spring-loaded by means of a torsional spring which is arranged on the rotation axis, one end of the torsion spring being supported by the pivotable over-travel and limit stop bracket and the other end of the torsion spring being supported by the upper guide rail adapter.

In a further aspect the seat adjuster mechanism comprises a seat adjuster bracket having a front surface in the direction of travel, which strikes against the extended travel full forward limit stop in the extended travel full forward position after the pivoted over-travel and limit stop bracket has bypassed the full forward limit stop upon activation of the easy-entry mechanism. The full forward limit stop comprises a fastening portion to be connected to the lower guide rail and a limit stop portion which extends into the path of travel of the limit stop arm of the pivotable over-travel and limit stop bracket to an extent that the limit stop arm strikes against the upright limit stop portion but can be bypassed by the pivoted limit stop arm upon activation of the easy-entry mechanism.

The functional comfort adjustment range is delimited by a full rear position and a comfort full forward position. In the full rear position for instance a guide piece bracket or rear surface of the locking device connected to the upper guide rail strikes against an internal rear limit stop such as a lower rail rivet which is connected to the lower guide rail of the guide rail pairs. In the comfort full forward position, however, the limit stop arm of the pivotable over-travel and limit stop bracket strikes against the comfort full forward limit stop which can be bypassed by the pivoted limit stop arm upon activation of the easy-entry mechanism to enter into the extended travel range. The most forward end of the extended travel range is defined by an abutment of the front surface of the seat adjuster bracket at the extended travel full forward limit stop.

For transferring an activation of the easy-entry mechanism to the over-travel and limit stop mechanism the control arm of the pivotable over-travel and limit stop bracket is connected to a tab of an easy-entry rotation bracket of the easy-entry mechanism via a solid rod in a first embodiment.

In a second embodiment the control arm of the pivotable over-travel and limit stop bracket is connected to a Bowden cable which is routed up the backrest of the vehicle seat to an easy-entry activation lever, the Bowden cable mount being added to an easy-entry mechanism bracket secured to the upper guide rail.

In a third embodiment the control arm of the pivotable over-travel and limit stop bracket is connected to a tab of an easy-entry rotation bracket of the easy-entry mechanism which is connected to a Bowden cable of the easy-entry mechanism.

In a preferred embodiment of the present invention the longitudinal rail guide has first and second guide rail pairs each including a lower guide rail fixed to the vehicle structure and an upper guide rail fixed to the seat frame and displaceable along the lower guide rail, a seat adjuster mechanism including a releasable locking device for locking and unlocking the position of the upper guide rails relative to the lower guide rails in a design position of a passenger between a full rear limit stop and a comfort full forward limit stop defining a functional comfort adjustment range within which the vehicle seat is adjustable in the design position, an easy-entry mechanism for displacing the vehicle seat to a front position upon folding down the backrest onto the seat surface, and an over-travel and limit stop mechanism including pivotable over-travel and limit stop brackets rotatably mounted to the upper rails, said pivotable over-travel and limit stop brackets being adapted to rotate to bypass the comfort full forward limit stops upon activation of the easy-entry mechanism for entering an extended travel range.

A complete packaged module for diverse functional travel ranges between seat adjuster variants which can be easily incorporated in existing easy-entry mechanisms and seat adjusters contains an easy-entry rotation bracket including a tab for receiving the solid rod or Bowden cable, the pivotable over-travel and limit stop bracket and addable sleeves of different size in the direction of travel to compensate for diverse functional travel ranges between seat adjuster variants form a complete packaged module. This provides a cost effective concept by making use of standardized parts for different sizes and configurations of vehicle seats to compensate for different functional travel ranges between seat adjuster variants.

BRIEF DESCRIPTION OF THE DRAWINGS

The various features and advantages of the present invention may be more readily understood with reference to the following detailed description and the embodiments shown in the drawings. Herein.

FIG. 3 shows a partial side view of the arrangement according to FIGS. 1 and 2;

FIG. 4 shows a perspective view of two parallel guide rail pairs of a longitudinal rail guide according to FIGS. 1 and 2;

FIG. 5 shows a side view of a longitudinally adjustable vehicle seat with symbolized end stops defining a functional comfort adjustment range including a comfort position of a passenger and an extended travel range upon activation of the easy-entry mechanism;

FIG. 6 shows a partial side view of the longitudinally adjustable vehicle seat according to FIG. 5 explaining the rotation of the pivotable over-travel and limit stop mechanism to bypass a comfort full forward position to enter into the extended travel range;

FIG. 7 shows a side view of a design position within the functional comfort adjustment range;

FIG. 8 shows a side view of a full rear position at the rear end of the functional comfort adjustment range;

FIG. 14 shows a perspective view of a guide rail pair of a longitudinal rail guide for a vehicle seat and a direct cable connection between an easy-entry mechanism and a modular over-travel and limit stop mechanism;

FIG. 15 shows a partial side view of the arrangement according to FIG. 14;

FIG. 16 shows a perspective view of a modular over-travel and limit stop mechanism kit and FIG. 17 shows a perspective view of different applications of the modular over-travel and limit stop mechanism kit according to FIG. 16.

DETAILED DESCRIPTION

Figure 1:
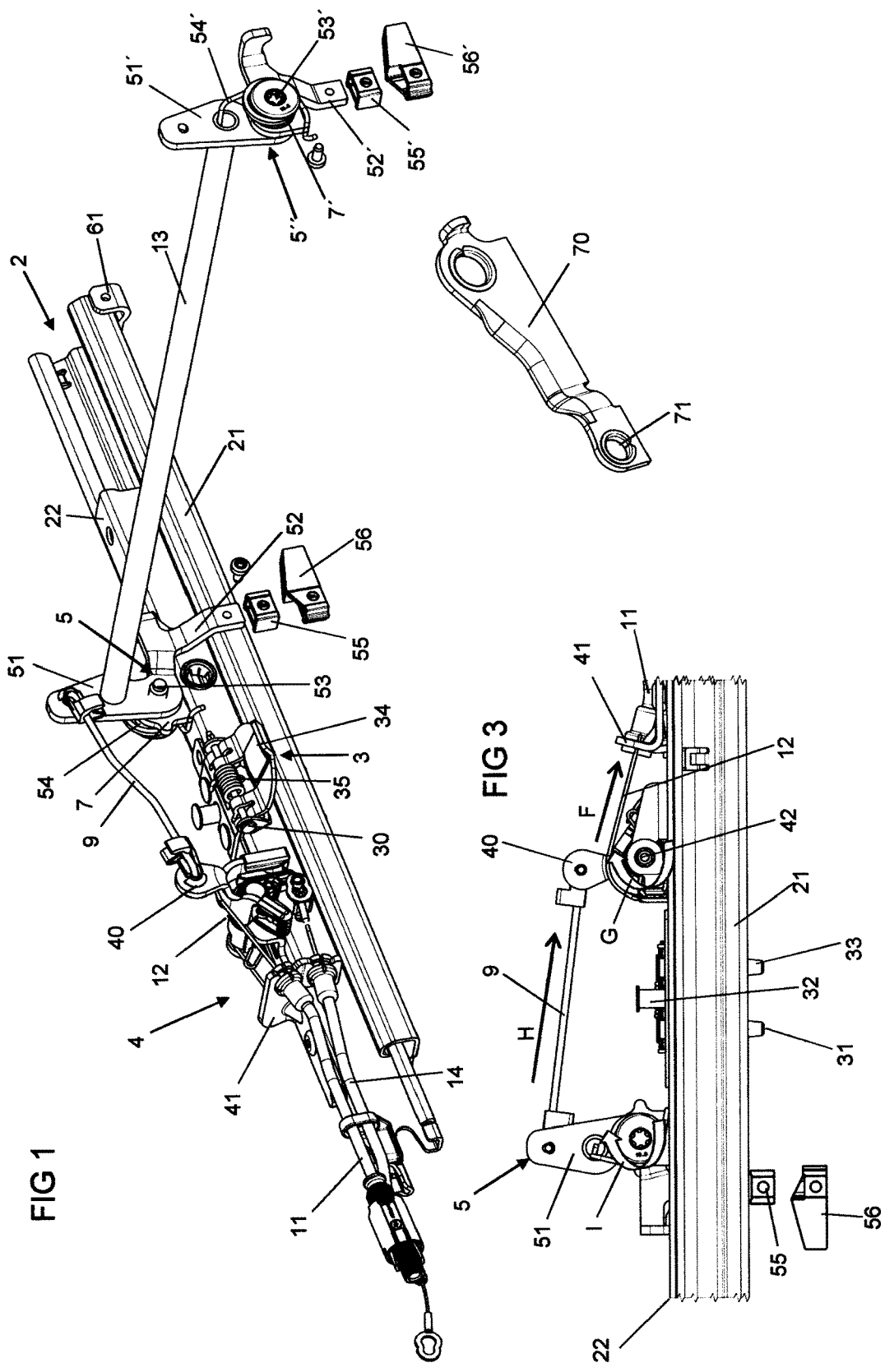
FIGS. 1 and 2 show a perspective view of a guide rail pair of a longitudinal rail guide for a vehicle seat and a direct connection with a solid link between an easy-entry mechanism and a modular over-travel and limit stop mechanism.

Subsequently, embodiments of the invention shall be described in detail with reference to the drawings. In the drawings, like reference numerals designate like structural elements.

It is to be noted that the embodiments are not limiting for the invention, but merely represent illustrative examples.

Referring to the drawings and initially to FIGS. 1-6 showing perspective representations from different views, a partial side view and a full side view of a rail adjustment system for a longitudinally adjustable vehicle seat with a seat frame 1 to which (not shown) a backrest is pivotally mounted which is foldable down in the direction of a seat surface of the seat frame 1 upon activation of an easy-entry mechanism.

Figure 2:
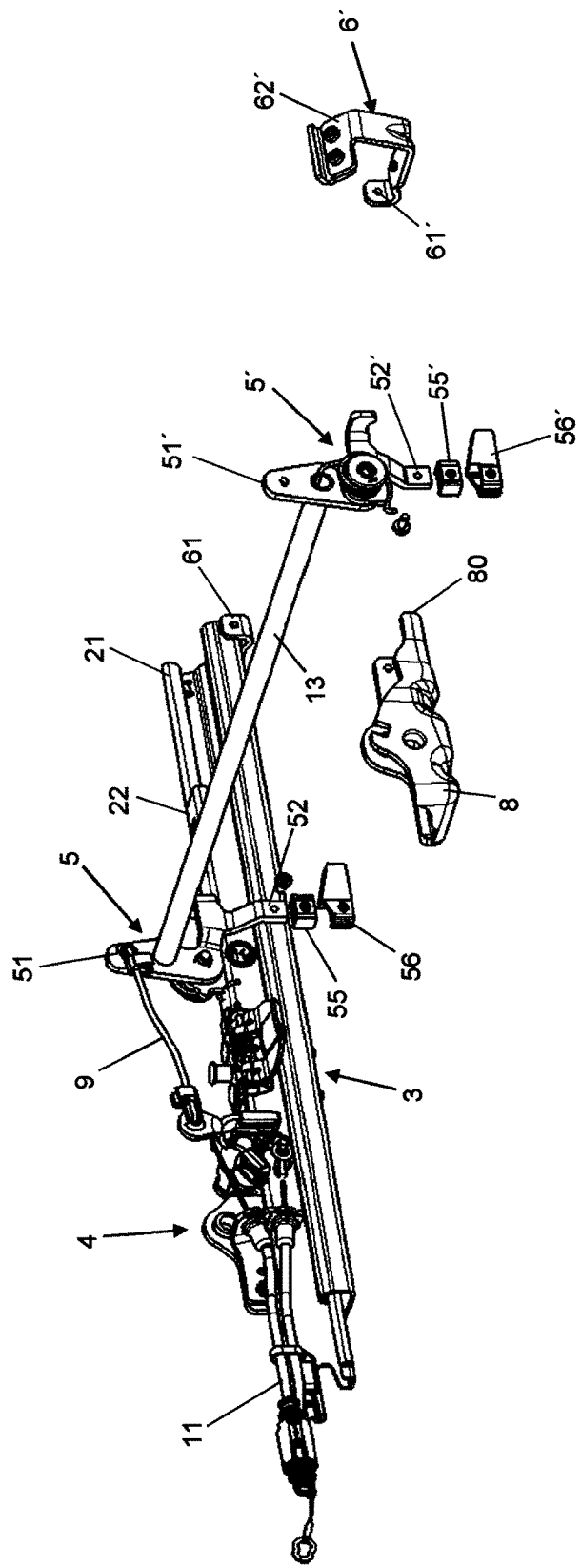

A longitudinal rail guide comprises two parallel guide rail pairs 2, 2' according to FIG. 4 whereas FIGS. 1 and 2 only show one guide rail pair 2 of the two parallel guide rail pairs 2, 2'. The guide rail pairs 2, 2' include a lower guide rail 21, 21' mounted to the vehicle structure or body and an upper guide rail 22, 22' connected to the seat frame of the vehicle seat and displaceable along the lower guide rail 21, 21' to allow different longitudinal positions of the vehicle seat within a functional comfort adjustment range or functional travel range D. The functional comfort adjustment range D extends between a full rear position A and a comfort full forward position B of the vehicle seat according to FIG. 5 and includes a comfortable design position P for an individual passenger.

In FIG. 5 the different positions are symbolized by a limit stop arm 52 of a pivotable over-travel and limit stop bracket 5, 5' which will be described hereinafter.

A releasable locking device 3 for locking and unlocking the position of the upper guide rails 22, 22' relative to the lower guide rails 21, 21' comprises three locking pins 31, 32, 33 arranged one behind the other, which are adjustable in vertical direction from a locked position in which two of the three locking pins 31, 32, 33 engage the respective locking bores in the lower guide rails 21, 21' into an unlocked position. The locking pins 31, 32, 33 are guided through bores of a supporting plate 30 and through bores of the upper guide rails 22, 22' of the rail adjustment system, which are aligned therewith. Biased spring elements, which enclose the locking pins 31, 32, 33 are supported both on the supporting plate 30 and on a groove or other spring support of the locking pins 31, 32, 33, build up a restoring force acting on the locking pins 31, 32, 33 into the locking position.

To the supporting plate 30 an unlocker comb 34 is pivotally articulated, which with fork-like cutouts engages behind the upper ends of the locking pins 31, 32, 33 and by means of an actuating device including an unlocking Bowden 14 lifts the locking pins 31, 32, 33 from the locked position into an unlocked position against the restoring force of the spring elements enclosing the locking pins 31, 32, 33. The unlocker comb 34 is mounted on the supporting plate 30 via a pivot pin extending parallel to the longitudinal extension of the upper and lower rails 21, 21'; 22, 22' and a coil spring 35 encloses the pivot pin for exerting a restoring force on the unlocker comb 34 in direction of the locked position of the locking device.

If the longitudinally adjustable vehicle seat is used e.g. for a two-door vehicle, the backrest of the vehicle seat is coupled to the longitudinal seat adjustment system to facilitate boarding into the back of the vehicle, such that when folding the backrest down in the direction of the seat surface the locking device 3 associated with the longitudinal rail guides 2, 2' is unlocked and the vehicle seat may be advanced with the folded-down backrest from the functional comfort adjustment range D into an extended travel full forward position C of an extended travel range E upon activation of the easy-entry mechanism.

The easy-entry mechanism comprises a Bowden cable 11 cooperating with the backrest and serves to couple the backrest to the locking device 3 of the longitudinal rail guide 2, 2' in order to be able to release the locking device 3 when folding the backrest down onto the seat surface of the seat frame 1 such that the two guide rails 21, 21', 22, 22' may be displaced relative to one another for advancing the seat frame 1 from the functional comfort adjustment range D into the extended travel range E as shown in FIG. 5.

The sheath of the Bowden cable 11 is supported by a Bowden cable mount 41 of an easy-entry rotation bracket 4 whereas the cable 12 is connected to a drum 42 rotably mounted on the easy-entry rotation bracket 4 and connected to a tab 40.

A solid rod 9 with end connectors is fastened both to the tab 40 and to a control arm 51, 51' of a pivotable over-travel and limit stop bracket 5, 5' of an over-travel and limit stop mechanism which is mounted to the upper guide rails 22, 22' of the guide rail pairs 2, 2' and which includes a limit stop arm 52, 52' and a rotation axis 53, 53' between the control arm 51, 51' and the limit stop arm 52, 52'. The rotation axis 53, 53' is connected to a bearing of a separate bracket 7, 7' secured to the upper guide rails 22, 22' and houses a torsion spring 54, 54', one end of which is supported by the pivotable over-travel and limit stop bracket 5, 5' and the other end of which is supported by the separate bracket 7, 7', such that the pivotable over-travel and limit stop bracket 5, 5' is spring-loaded into an upright position of the limit stop arm 52, 52'.

Figure 11:
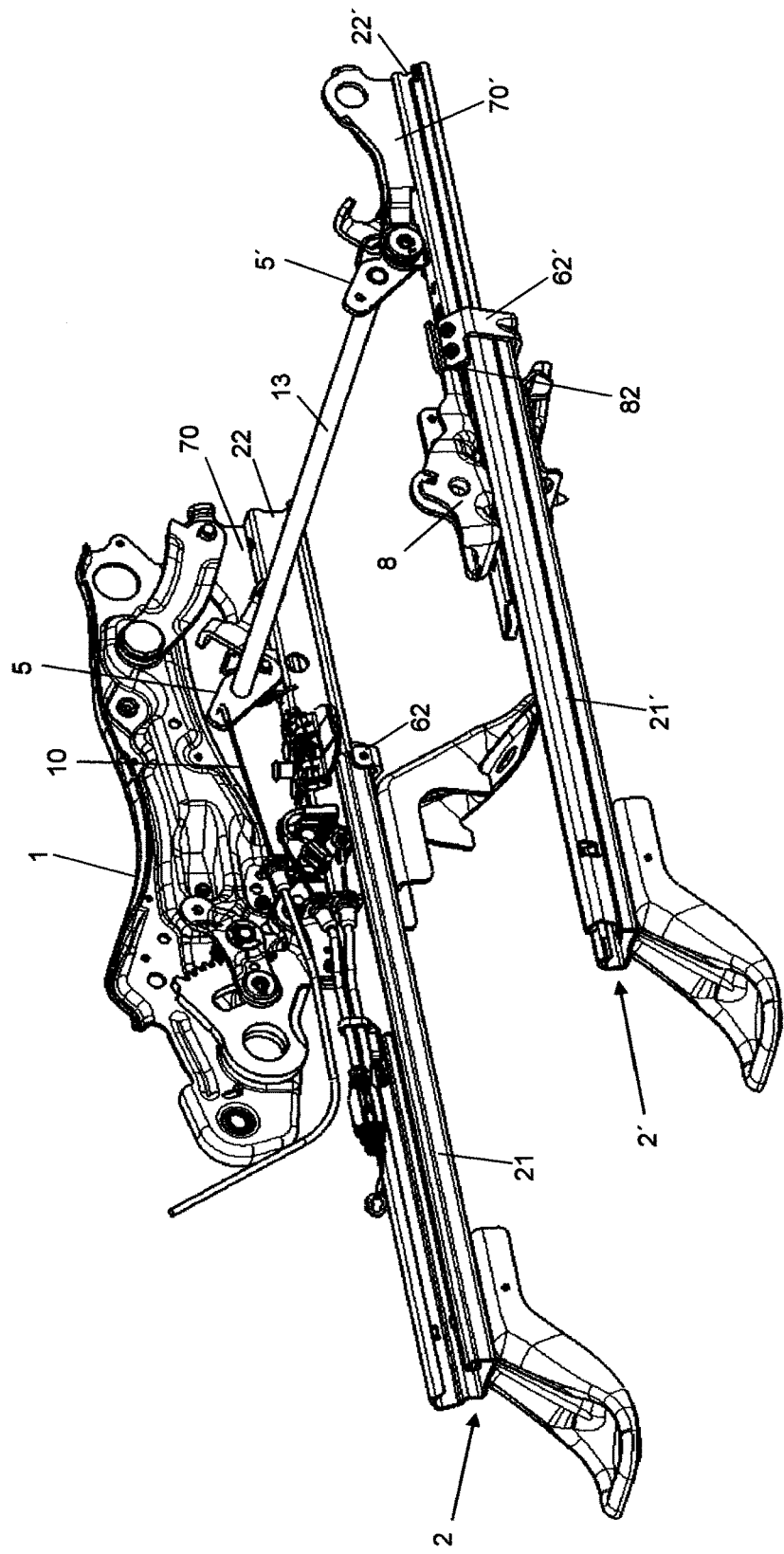
FIG. 11 shows a perspective view of the extended travel full forward position of the extended travel range according to FIG. 10.

A possible option is to connect the rotation axis of the pivotable over-travel and limit stop bracket 5, 5' to a bearing 71 of a seat adjuster adapter 70 shown separately in FIG. 1 and mounted to the pivotable over-travel and limit stop bracket 5, 5' in FIG. 11.

For a transfer of a rotation of the pivotable over-travel and limit stop bracket 5 mounted to the first guide rail pair 2 to the second guide rail pair 2' at the other side of the seat frame 1 a crossbar 13 connects the control arm 51 with the control arm 51' of the second pivotable over-travel and limit stop bracket 5' which comprises the limit stop arm 52', the rotation axis 53' and the torsion spring 54'.

Figure 9:
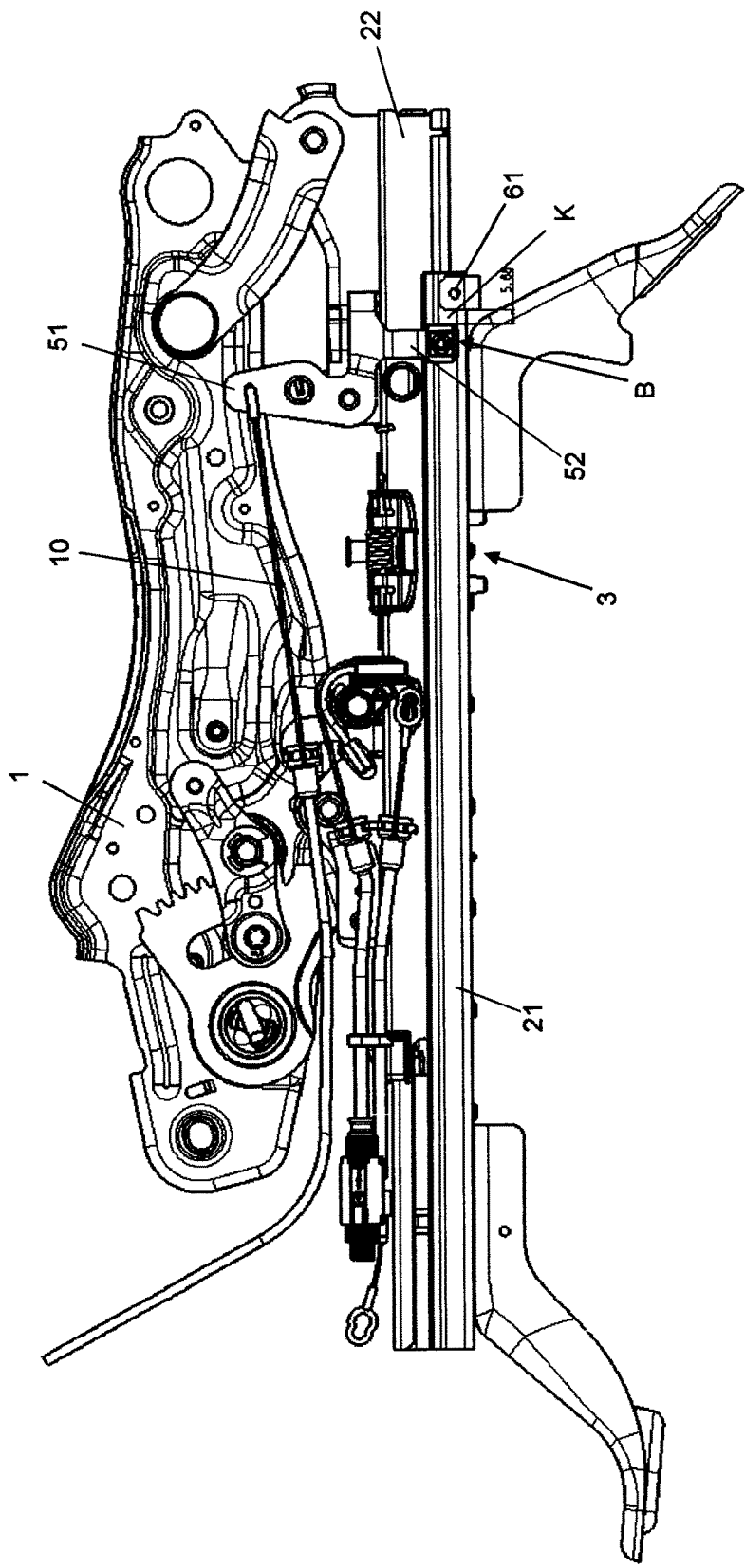
FIG. 9 shows a side view of a comfort full forward position at the foremost end of the functional comfort adjustment range.

During normal operation of the longitudinally adjustable vehicle seat the seat frame 1 is movable within the functional comfort adjustment range D according to FIG. 5 to find a design position P for the individual passenger according to FIG. 7 between the full rear position A according to FIG. 8 and the comfort full forward position B according to FIG. 9 when the limit stop arm 52, 52' of the pivotable over-travel and limit stop bracket 5, 5' strikes against the forward limit stop 62, 62' mounted to the lower guide rail 21, 21' defining the comfort full forward position B of the functional comfort adjustment range D.

In the full rear position shown in FIG. 8 for instance a guide piece bracket or rear surface of the locking device 3 connected to the upper guide rail 22, 22' strikes against an internal rear limit stop 60 such as a lower rail rivet which is connected to the lower guide rail 21' of the guide rail pair 2'. FIG. 8 shows a memory stone 35 sandwiched between the guide piece bracket (e.g. the supporting plate 30 of the locking device 3) and the lower rail rivet 60 at the lower rail 21 of the other guide rail pair 2.

Upon activation of the easy-entry mechanism by folding the backrest down in the direction of the seat surface the locking device 3 associated with the longitudinal rail guide 2 is unlocked and the cable 12 of the Bowden cable 11 is moved in the direction of an arrow F according to FIG. 3 rotating the drum 42 of the easy-entry rotation bracket 4 together with the tab 40 in the direction of an arrow G. Consequently, the solid rod 9 is moved in the direction of an arrow H and thus rotates the pivotable over-travel and limit stop bracket 5 in the direction of an arrow I such that the limit stop arm 52 of the over-travel and limit stop bracket 5 is rotated from an upright orientation U to a tilt or pivot orientation T as shown in FIG. 6 for bypassing the forward limit stop 62 to allow an entering into the extended travel range E such that the seat frame 1 and thus the vehicle seat can be moved to the extended travel full forward position C to facilitate boarding into the back of the vehicle.

In the comfort full forward position B the limit stop arm 52 of the pivotable over-travel and limit stop bracket 5 strikes against the comfort full forward limit stops 61, 61' which are mounted to the lower guide rails 21, 21' and which can be bypassed by the pivoted limit stop arm 52 upon activation of the easy-entry mechanism to enter into the extended travel range E.

Figure 10:
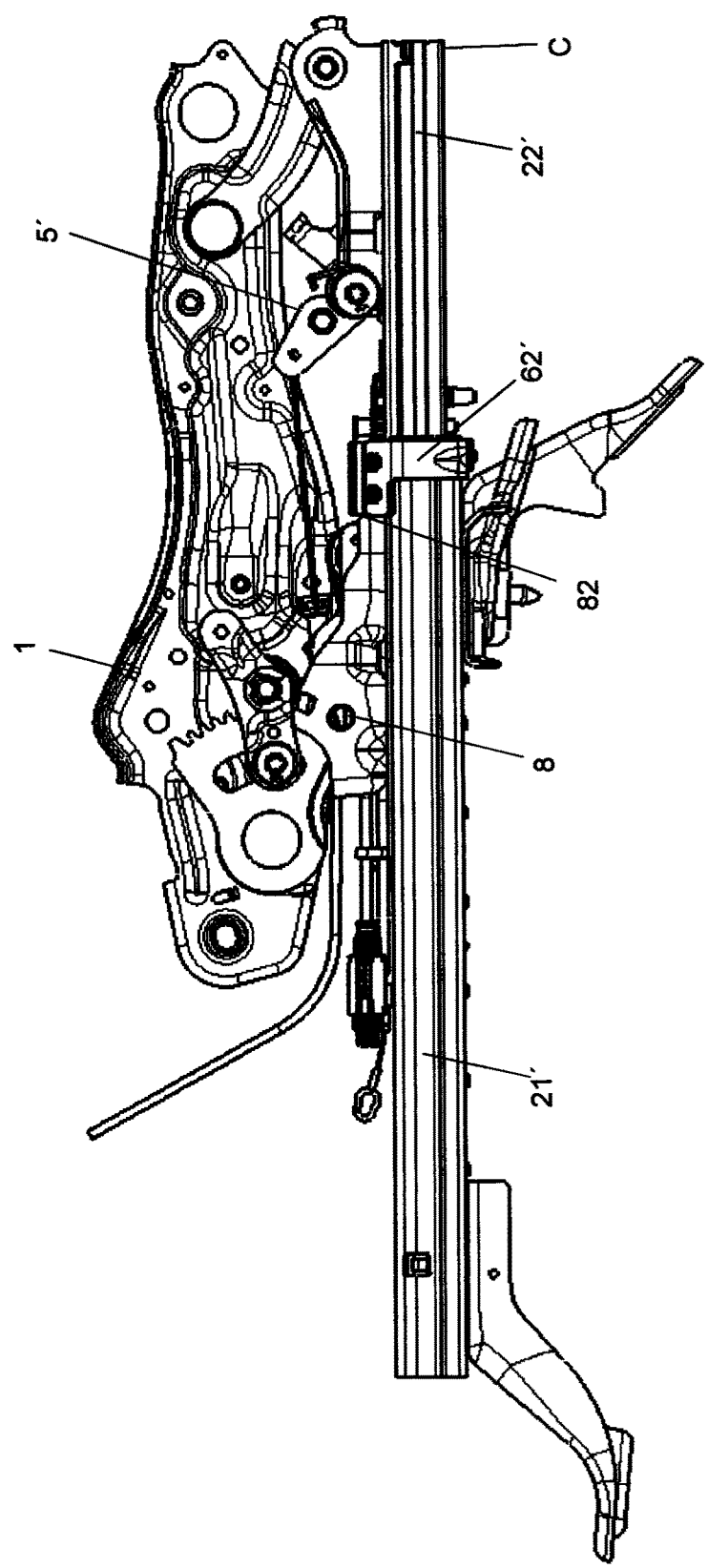
FIG. 10 shows a side view of an extended travel full forward position of the extended travel range.

The extended travel full forward position C at the foremost end of the extended travel range E is defined by an abutment of a front surface 80 of the seat adjuster bracket 8 at the extended travel full forward limit stop 62' as shown in the side view of the adjustable vehicle seat according to FIG. 10 and the perspective view shown in FIG. 11.

According to FIGS. 2, 4, 10, 11 and 16 the full forward limit stops 6, 6' mounted to the lower guide rails 21, 21' of the guide rail pairs 2, 2' differ from each other in that the full forward limit stop 6 of the first guide rail pair 2 extends into the path of travel at the inboard side of the lower guide rail 21 only with an arm 61 whereas the full forward limit stop 6' of the second guide rail pair 2 extends into the path of travel both at the inboard side with an arm 61' and with an arm 62' at the outboard side of the lower guide rail 21'.

As shown in FIG. 5 a gap K remains between the limit stop arm 52 of the pivotable over-travel and limit stop bracket 5 and the forward limit stop 61, 61' of the functional comfort adjustment range D to allow a rotation of the limit stop arm 52 of the pivotable over-travel and limit stop bracket 5 in the comfort full forward position B to bypass the forward limit stop 61, 61' to enter into the extended travel range E upon activation of the easy-entry mechanism. The distance of the gap K is less than one interval of the locking pins 31, 32, 33 such that two locking pins 31, 32, 33 will engage the respective locking bores in the lower guide rail 21 and the adjuster will lock in the previous interval.

To accommodate different functional comfort adjustment ranges and extended travel ranges to compensate for diverse functional travel ranges between seat adjuster variants travel limiters of different size can be added to the limit stop arms 52 and 52'. FIG. 1 shows two travel limiters in the form of sleeves 55, 56 and 55', 56' of different size in the direction of travel, namely short sleeves 55, 55' allowing a long functional comfort adjustment range and extended travel range and long sleeves 56, 56' providing a reduced functional comfort adjustment range and reduced extended travel range. The sleeves 55, 56 and 55', 56' comprise a connection portion for connecting the sleeves 55, 56 and 55', 56' to the end of the limit stop arm 52, 52' of the pivotable over-travel and limit stop bracket 5, 5'.

Figure 12:
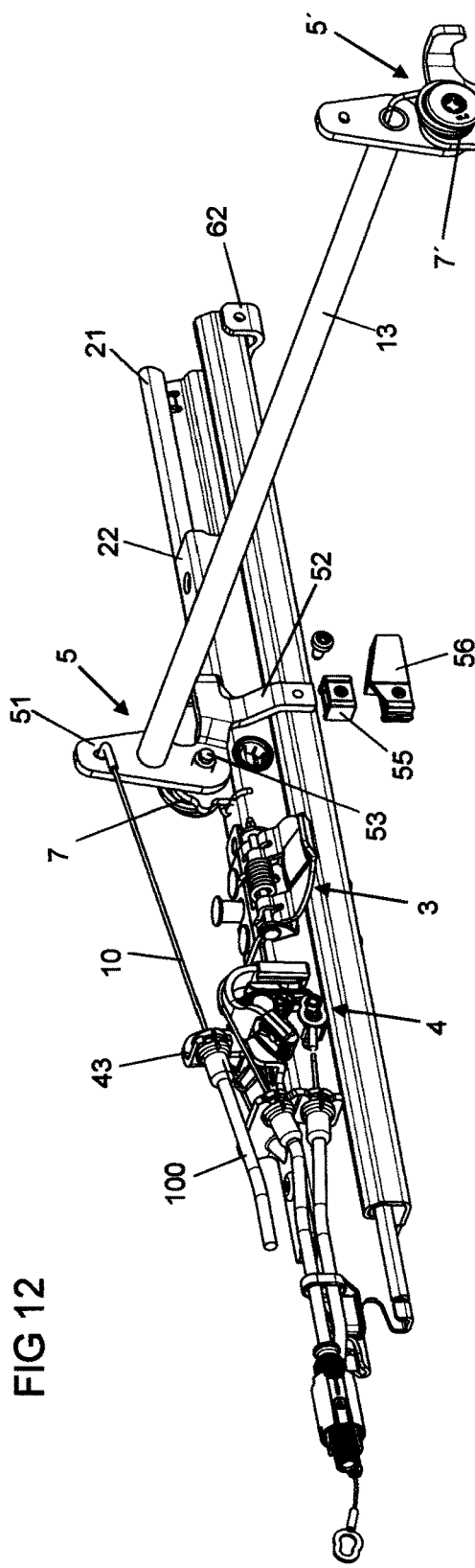
FIG. 12 shows a perspective view of a guide rail pair of a longitudinal rail guide for a vehicle seat and a Bowden cable connection between an easy-entry mechanism and a modular over-travel and limit stop mechanism.
Figure 13:
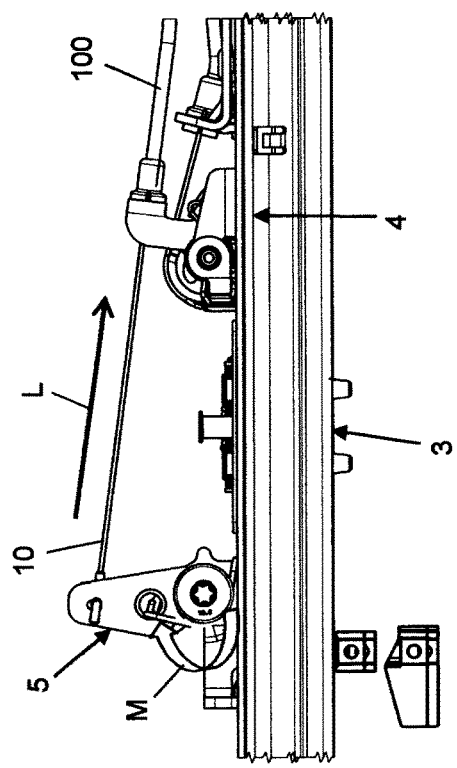
FIG. 13 shows a partial side view of the arrangement according to FIG. 12.

The perspective view of a guide rail pair 21, 22 of a longitudinal rail guide for a vehicle seat, seat adjuster and modular over-travel and limit stop mechanism according to FIG. 12 and the partial side view of the arrangement according to FIG. 13 differ from the arrangement according to FIGS. 1-6 in that an additional Bowden 10, 100 is routed up the backrest to an easy-entry activation lever connected to the backrest. The sheath 100 of the Bowden cable 10, 100 is supported by a Bowden cable mount 43 of the easy-entry rotation bracket 4 whereas the inner cable 10 of the Bowden cable 10, 100 is directly connected to the control arm 51 of the pivotable over-travel and limit stop bracket 5.

An operation of the easy-entry activation lever moves the inner Bowden cable 10 in the direction of an arrow L according to FIG. 13 and rotates the pivotable over-travel and limit stop bracket 5 according to an arrow M of FIG. 13. Thus, the limit stop arm 52 of the pivotable over-travel and limit stop bracket 5 can bypass the forward limit stop 62 such that the seat frame 1 can enter into the extended travel range E of FIG. 5 and the vehicle seat is movable to the extended travel full forward position C to facilitate boarding into the back of the vehicle.

The perspective view of a guide rail pair 21, 22 of a longitudinal rail guide for a vehicle seat, seat adjuster and modular over-travel and limit stop mechanism according to FIG. 14 and the partial side view of the arrangement according to FIG. 15 show a third embodiment for a link between the easy-entry mechanism and the over-travel and limit stop mechanism. This alternative solution differs from the arrangement of a solid link as in the arrangement according to FIGS. 1-6 and a Bowden cable routed up the backrest to an easy-entry activation lever according to the arrangement of FIGS. 12 and 13 in that a Bowden cable 12, 120 is directly tied to the easy-entry mechanism. The sheath 120 of the Bowden cable 12, 120 is supported by a Bowden cable mount 41 of an easy-entry rotation bracket 4 whereas the inner Bowden cable 12 is connected to a drum 42 rotably mounted on the easy-entry rotation bracket 4.

A cable 15 is connected to the drum 42 such that an activation of the easy-entry mechanism results in a movement of the inner Bowden cable 12 and a rotation of the drum 42 which moves the cable 15 in the direction of an arrow N according to FIG. 15 and thus in a rotation of the pivotable over-travel and limit stop bracket 5 according to an arrow O of FIG. 15 such that the limit stop arm 52 of the pivotable over-travel and limit stop bracket 5 can bypass the comfort full forward limit stop 61 and the seat frame 1 can enter into the extended travel range E of FIG. 5 such that the vehicle seat is movable to the extended travel full forward position C to facilitate boarding into the back of the vehicle.

An important advantage of the specific structure and function of the over-travel and limit stop bracket mechanism is a modular structure of the functional parts of the over-travel and limit stop mechanism to compensate for diverse functional travel ranges between seat adjuster variants.

Thus, in a preferred embodiment of the present invention depicted in FIG. 16 the easy-entry rotation bracket 4 including the tab 40 for receiving the solid rod 9 according to FIGS. 1-6, the Bowden cable mount 43 for receiving the Bowden cable 10, 100 according to FIGS. 12 and 13 and the drum 42 for receiving the Bowden cable 12, 120 according to FIGS. 14 and 15, the pivotable over-travel and limit stop brackets 5 and 5', the addable sleeves 55, 56; 55', 56' of different size in the direction of travel and the crossbar 13 form a complete packaged modular over-travel kit 16 which is applicable to any adjustment system with a functional comfort adjustment range where an easy-entry mechanism with an extended travel range is being used to compensate for diverse functional travel ranges between seat adjuster variants.

The length X of the solid rod 9 according to FIGS. 1-6 or the length X of the Bowden cable 10, 100 according to FIGS. 12 and 13 or the length X of the Bowden cable 12, 120 according to FIGS. 14 and 15 is adjustable corresponding to the requirement of the seat manufacturer or car producer.

FIG. 17 shows in a perspective view an application of the modular over-travel and limit stop mechanism kit according to FIG. 16 in a 4-way Easy-Entry Seat Adjuster 17 and a 2-way Easy-Entry Seat Adjuster 18 by example. Though the 4-way Easy-Entry Seat Adjuster 17 has a functional comfort adjustment range of 212.23 mm and an extended travel range of 116.865 mm resulting in a total range of 329.69 mm whereas the 2-way Easy-Entry Seat Adjuster 18 has a functional comfort adjustment range of 192.23 mm and an extended travel range of 137.46 mm resulting in the same total range of 329.69 mm the same modular over-travel kit is applicable to be connected to the respective adjustment arrangement using either the short sleeves 55, 55' allowing a long functional comfort adjustment range and extended travel range or the long sleeves 56, 56' providing a reduced functional comfort adjustment range and reduced extended travel range, respectively.

The embodiment described herein is not limiting for the invention as set forth in the claims, but merely provide illustrative examples. The invention can be carried out in an entirely different manner in entirely different embodiments.

REFERENCE NUMERALS 1 seat frame
2 guide rail pair
3 locking device
4 easy-entry rotation bracket
5, 5' pivotable over-travel and limit stop bracket
6, 6' full forward limit stop
7 separate bracket
8 seat adjuster bracket
9 solid rod
10 inner Bowden cable
11 Bowden cable
12 inner Bowden cable
13 crossbar
14 unlocking Bowden
15 cable
16 packaged modular over-travel kit
17 4-way Easy-Entry Seat Adjuster
18 2-way Easy-Entry Seat Adjuster
19 Bowden cable
21 lower guide rail
22 upper guide rail
30 supporting plate
31-33 locking pins
34 unlocker comb
35 memory stone
40 tab
41, 43 Bowden cable mount
42 drum
51, 51' control arm
52, 52' limit stop arm
53, 53' rotation axis
54, 54' torsion spring
55, 55' short sleeves
56, 56' long sleeves
60 internal rear limit stop (lower rail rivet)
61, 61' comfort full forward limit stop
62' extended travel full forward limit stop
70 seat adjuster adapter
71 bearing
80 front surface of the seat adjuster bracket
90 inner cable
100 Bowden cable sheath
120 Bowden cable sheath
A full rear position
B comfort full forward position
C extended travel full forward position
D functional comfort adjustment range
E extended travel range
K gap
P design position
X length of solid rod or Bowden

The invention claimed is:

1. A longitudinally adjustable vehicle seat comprising
a seat frame,
a backrest pivotally mounted on the seat frame and foldable down in the direction of a seat surface of the seat frame,
a longitudinal rail guide having at least one guide rail pair including a lower guide rail fixed to the vehicle structure and an upper guide rail fixed to the seat frame and displaceable along the lower guide rail,
a seat adjuster mechanism including a releasable locking device for locking and unlocking the position of the upper guide rail relative to the lower guide rail in a design position of a passenger between a full rear limit stop and a comfort full forward limit stop defining a functional comfort adjustment range within which the vehicle seat is adjustable in the design position,
an easy-entry mechanism for displacing the vehicle seat to a front position upon folding down the backrest onto the seat surface, and
an over-travel and limit stop mechanism including a pivotable over-travel and limit stop bracket rotatably mounted to the upper guide rail, said pivotable over-travel and limit stop bracket being adapted to rotate to bypass the comfort full forward limit stop upon activation of the easy-entry mechanism for entering an extended travel range and comprising a limit stop arm configured to strike against the comfort full forward limit stop defining the comfort full forward position of the functional comfort adjustment range, wherein said limit stop arm is adapted to accommodate at least two different travel ranges to compensate for at least two functional travel ranges between at least two seat adjuster variants.

2. The vehicle seat of claim 1 wherein said pivotable over-travel and limit stop bracket is secured to the upper guide rail at a set position in order to achieve the desired functional comfort adjustment range.

3. The vehicle seat of claim 1 wherein said pivotable over-travel and limit stop bracket is connected to the upper guide rail and comprises a control arm and a rotation axis between the control arm and the limit stop arm, said control arm being connected to the easy-entry mechanism.

4. The vehicle seat of claim 1 wherein travel limiters are selectable from a set of at least two different sizes of travel limiters, wherein any travel limiter from the set is addable to said limit stop arm and the set of at least two different sizes of travel limiters serves to compensate for at least two functional travel ranges between at least two seat adjuster variants.

5. The vehicle seat of claim 4 wherein said travel limiters are sleeves of at least two different sizes in the direction of travel with a connection portion for connecting the sleeves to the end of said limit stop arm of the pivotable over-travel and limit stop bracket.

6. The vehicle seat of claim 3 wherein the rotation axis of said pivotable over-travel and limit stop bracket is incorporated into a bearing of a seat adjuster adapter secured to said upper guide rail.

7. The vehicle seat of claim 5 wherein said pivotable over-travel and limit stop bracket is spring-loaded by means of a torsion spring which is arranged on the rotation axis, one end of said torsion spring being supported by the pivotable over-travel and limit stop bracket and the other end of said torsion spring being supported by said seat adjuster.

8. The vehicle seat of claim 1 wherein said seat adjuster mechanism comprises a full forward limit stop and a seat adjuster bracket having a front surface in the direction of travel, which strikes against the full forward limit stop in the extended travel full forward position after the pivotable over-travel and limit stop bracket has bypassed the comfort full forward limit stop upon activation of the easy-entry mechanism.

9. The vehicle seat of claim 8 wherein the full forward limit stop comprises an extended travel full forward limit stop to be connected to the lower guide rail and the DE comfort full forward limit stop which is configured to extend into the path of travel of the limit stop arm of the pivotable over-travel and limit stop bracket to an extent that the limit stop arm strikes against the comfort full forward limit stop, but is configured to bypass the comfort full forward limit stop upon activation of the easy-entry mechanism.

10. The vehicle seat of claim 3 wherein said control arm of said pivotable over-travel and limit stop bracket is connected to a tab of an easy-entry rotation bracket of said easy-entry mechanism via a solid rod.

11. The vehicle seat of claim 3 wherein said control arm of said pivotable over-travel and limit stop bracket is connected to a Bowden cable which is routed up the backrest of the vehicle seat to an easy-entry activation lever, the Bowden cable mount being added to an easy-entry rotation bracket secured to the upper guide rail.

12. The vehicle seat of claim 3 wherein said control arm of said pivotable over-travel and limit stop bracket is connected to a tab of an easy-entry rotation bracket of said easy-entry mechanism which is connected to a Bowden cable of said easy-entry mechanism.

13. The vehicle seat of claim 1 wherein the longitudinal rail guide has
    first and second guide rail pairs each including a lower guide rail fixed to the vehicle structure and an upper guide rail fixed to the seat frame and displaceable along the lower guide rail,
    a seat adjuster mechanism including a releasable locking device for locking and unlocking the position of the upper guide rails relative to the lower guide rails in a design position of a passenger between a full rear limit stop and a comfort full forward limit stop defining a functional comfort adjustment range within which the vehicle seat is adjustable in the design position,
    an easy-entry mechanism for displacing the vehicle seat to a front position upon folding down the backrest onto the seat surface,
    an over-travel and limit stop mechanism including pivotable over-travel and limit stop brackets rotatably mounted to the upper rails, said pivotable over-travel and limit stop brackets being adapted to rotate to bypass the comfort full forward limit stops upon activation of the easy-entry mechanism for entering an extended travel range.

14. The vehicle seat of claim 1, wherein an easy-entry rotation bracket comprised in said easy-entry mechanism including a tab for receiving a solid rod or a Bowden cable, said pivotable over-travel and limit stop bracket, and a set of at least two sleeves of different size in the direction of travel of the vehicle seat to compensate for at least two functional travel ranges between at least two seat adjuster variants and being addable to said limit stop arm of said pivotable over-travel and limit stop bracket to form a complete packaged module.

* * * * *

UNITED STATES PATENT AND TRADEMARK OFFICE
CERTIFICATE OF CORRECTION

PATENT NO. : 10,065,532 B2  
APPLICATION NO. : 14/942638  
DATED : September 4, 2018  
INVENTOR(S) : Leo Ioppolo et al.

Page 1 of 1

It is certified that error appears in the above-identified patent and that said Letters Patent is hereby corrected as shown below:

In the Claims

Column 11, Line 35, Claim 9       After "and the" delete "DE"

Signed and Sealed this  
Seventeenth Day of September, 2019

Andrei Iancu  
*Director of the United States Patent and Trademark Office*